Jan. 15, 1929.
W. J. HEINZEL
1,699,430
MOTOR VEHICLE SNOWSHOE
Filed May 3, 1926     2 Sheets-Sheet 1
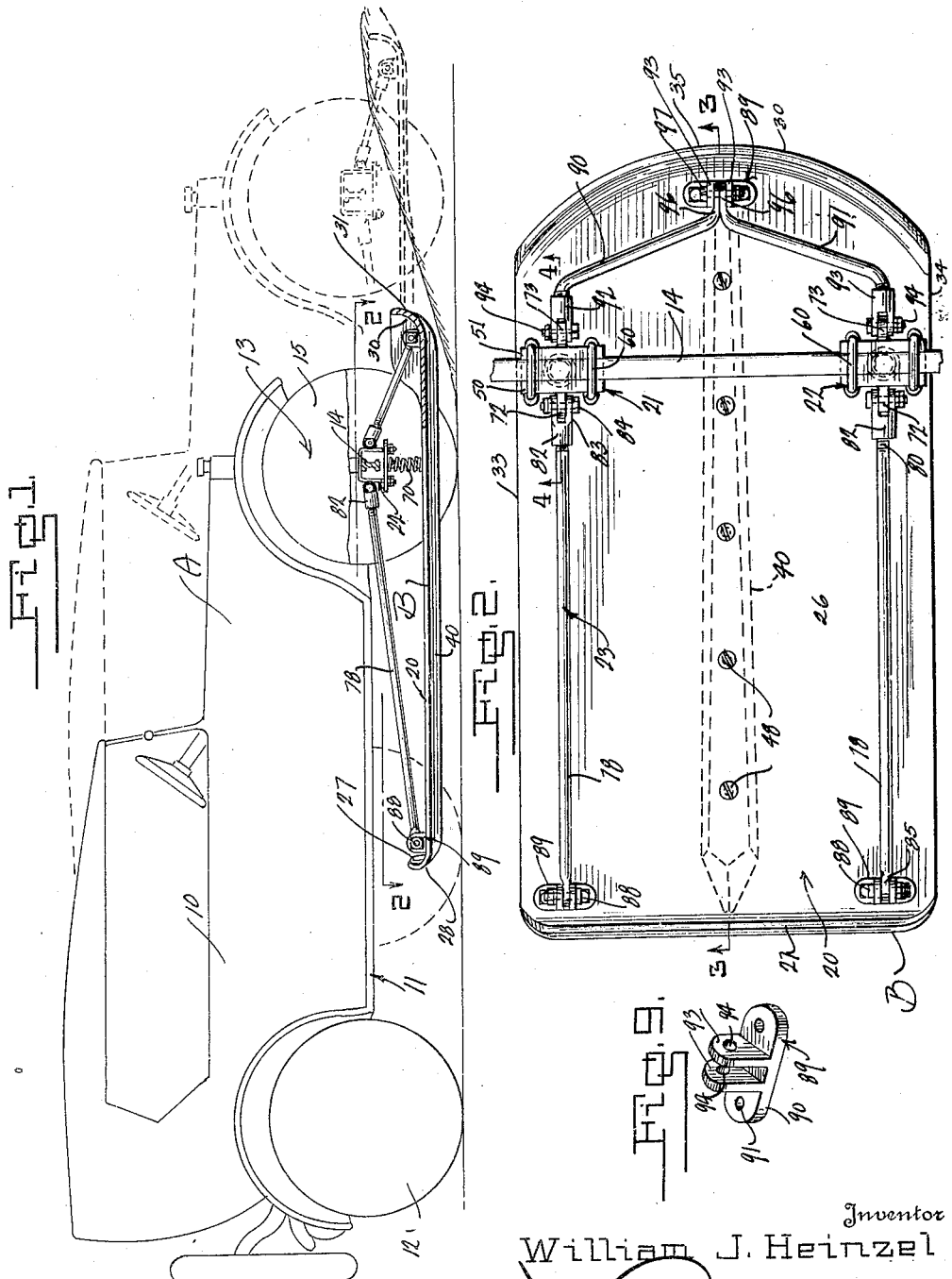
Inventor
William J. Heinzel
By Lancaster & Allwine
Attorneys Jan. 15, 1929.  1,699,430
W. J. HEINZEL
MOTOR VEHICLE SNOWSHOE
Filed May 3, 1926   2 Sheets-Sheet 2
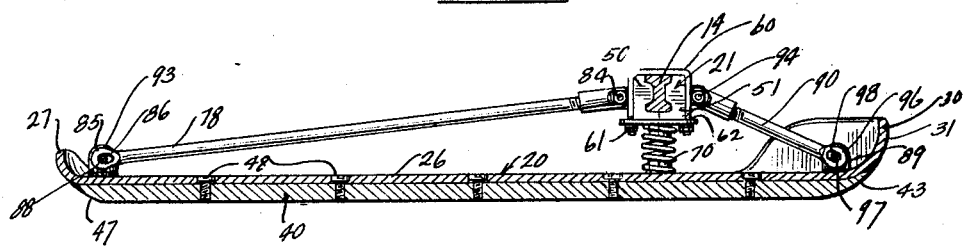
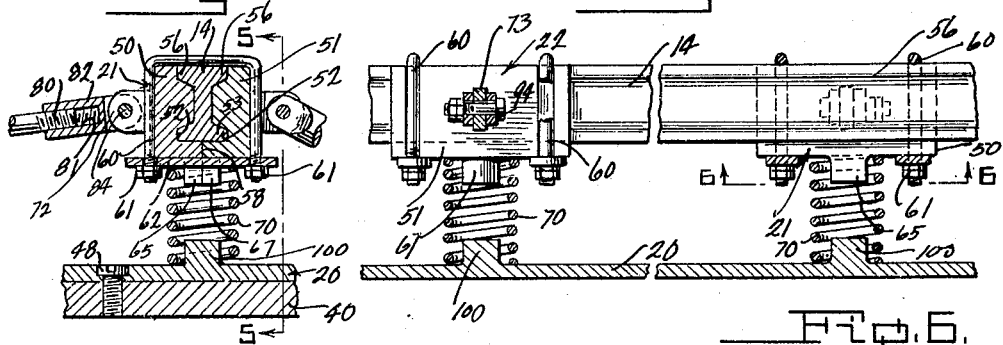
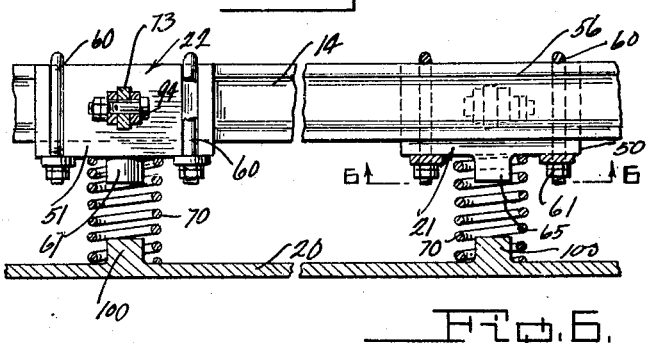
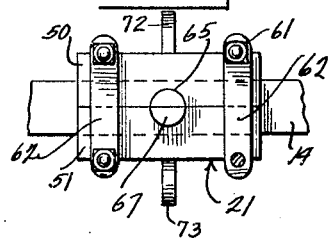
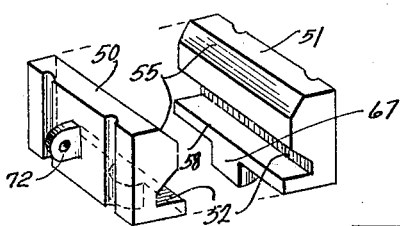
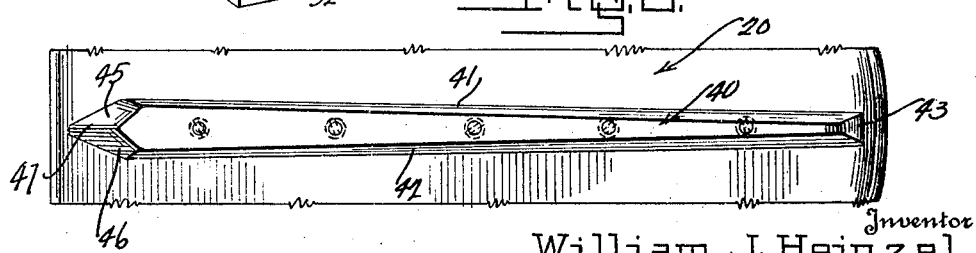
Inventor
William J. Heinzel
By Lancaster and Allwine
Attorneys Patented Jan. 15, 1929.

1,699,430

UNITED STATES PATENT OFFICE.

WILLIAM J. HEINZEL, OF CHEBOYGAN, MICHIGAN.

MOTOR-VEHICLE SNOWSHOE.

Application filed May 3, 1926. Serial No. 106,499.

This invention relates to an improved snow shoe for motor vehicles.

The primary object of this invention is the provision of a snow shoe adapted to be supported beneath the forward part or running gear of an automotive vehicle, for the purpose of elevating the front of the motor vehicle, to lift the front running wheels from heavy drifts as the car is being propelled, to facilitate quick movement of the motor vehicle without the stalling which commonly occurs when the motor vehicle is driven in snow of a predetermined depth.

In operating or driving motor vehicles over snow covered roads to the depth of approximately ten inches, occasionally rather solid or hard drifts of snow of varied length are encountered, and with the present motor vehicle, utilizing front supporting wheels and rear traction wheels, the front wheels of the car are quite commonly forced, by the momentum of the car, into the hard snow of such drifts, and the rear wheels are unable to push the front wheels of the car through the drift, necessitating numerous reversings of the car, and quick forward spurts in order to finally drive the front running wheels through the drift. Such procedure is very abusive to the motor vehicle, and much wear on the engine occurs. However, with the improved snow shoe construction, instead of driving the front wheels of the motor vehicle through the hard drifts of snow, the motor vehicle at the front is bodily lifted by the snow shoe construction, to permit the traction wheels of the car to drive the front wheels over the drift, with ease, since the snow shoe construction slides bodily over the drifts, and only comes into contact with the drifts of snow which are relatively hard, and which the front wheels are unable to penetrate during normal running operation; it of course being understood that the front running wheels are normally placed a predetermined distance below the lower surface of the snow shoe construction, to support the car or motor vehicle for normal running; the improved snow shoe construction taking effect during the driving of the car hard drifts have a tendency to stall the car.

Other objects and advantages of the invention will be apparent during the course of the following detailed description.

In the accompanying drawings, forming a part of this specification, and wherein similar reference characters designate corresponding parts throughout the several views, Figure 1 is a side elevation of a motor vehicle, showing the improved snow shoe attachment connected on the forward part thereof adjacent the front running gear, and showing in dotted lines the position to which the snow shoe elevates the front running wheels when encountering a hard drift of predetermined depth.

Figure 2 is a sectional view taken substantially on the line 2—2 of Figure 1, showing more particularly a plan view of the improved snow shoe construction.

Figure 3 is a longitudinal sectional view taken through the snow shoe construction substantially on the line 3—3 of Figure 2.

Figure 4 is a transverse sectional view taken through the snow shoe construction at an axle attached and spring supported portion thereof, substantially on the line 4—4 of Figure 2.

Figure 5 is a sectional view taken substantially on the line 5—5 of Figure 4.

Figure 6 is a sectional view taken substantially on the line 6—6 of Figure 5.

Figure 7 is a perspective view of an attaching clamp device utilized for the purpose of connecting portions of the snow shoe construction to the conventional front axle construction of a motor vehicle.

Figure 8 is a fragmentary bottom plan view of the improved snow shoe, showing a retaining rib or runner formed therewith to prevent lateral skid of the vehicle when the snow shoe construction is in operation, and to preferably guide the motor vehicle in a rectilinear path.

Figure 9 is a perspective view of a pivot connecting piece.

In the drawings, wherein for the purpose of illustration is shown only a preferred embodiment of this invention, the letter A may generally designate a motor vehicle of any approved type, upon which the improved snow shoe construction B is adapted to be mounted.

The motor vehicle A preferably consists of conventional parts, including a body 10 supported upon a conventional chassis construction 11, which consists of rear running gear 12 and front running gear 13 which includes a front axle 14 and front supporting wheels 15.

The improved snow shoe construction B preferably consists of the snow shoe member 20; attaching clamps 21 and 22 connected in spaced relation to the front axle 14 of the motor vehicle front running gear; and means 23 for connecting the snow shoe member 20 to the attaching clamps 21 and 22.

The snow shoe member 20 is preferably of metal, of any approved quality or kind, and it comprises a flat elongated and relatively wide body 26, which in width is less than the distance between the front running wheels 15, but which is of sufficient width to form a stable support for the vehicle when the snow shoe construction elevates the front end of the vehicle for support. The rear end of the body 26 has the upwardly arcuated end 27, providing a convex rearwardly and downwardly facing surface 28 to facilitate the riding of the snow shoe upwardly upon a drift or hard packed quantity of snow, when the vehicle is backed or reversed. The forward end of the snow shoe body 20 is upwardly arcuated at 30, providing a convex forwardly and downwardly facing surface 31; this forward arcuated portion 30 extending from the sides 33 and 34 of the snow shoe body 26 in a bowed relation from one side to the other. In this manner the front end 30 is bowed from side to side with a forward bulge, with the peak 35 of the bulge at the longitudinal center line of the snow shoe 20, to best facilitate entrance of the snow shoe upon hard packed drifts.

On the bottom surface of the body 26 of the snow shoe 20 is disposed a guide rib or ridge 40, which is preferably of steel or other metal, the same being a unit which may be detached from the snow shoe 20, as considerable wear will occur thereon. This guide rib 40 is preferably straight, and disposed at the longitudinal center of the shoe 20. It has tapering side surfaces 41 and 42 which taper at different inclinations along the length of the rib 40; the thickness of the rib 40 uniformly decreasing from the rear end thereof towards the front end thereof, where the said rib 40 is provided with an upwardly arcuated sloping edge 43. At the rear end the rib 40 is provided with the inclined or tapering sides 45 and 46, which taper rearwardly from the margin of the rib which is thickest, to a substantially chisel edge 47, which faces rearwardly and inclined to the vertical, in order to permit the ready insertion of the rib into a bank of snow upon reverse drive of the vehicle A. Due to the forward taper and diminishing width of the rib the same will readily enter the packed drift of snow upon forward drive of the vehicle, and will prevent lateral skid of the vehicle, and guide the same in a rectilinear line as driven by the traction wheels 12. This constitutes the steering means for the vehicle when the front running gear is off the normal ground surface. The rib or guide member 40 is preferably attached to the body 26 of the snow shoe 20 by means of machine screws 48 or the like, which are screwed inwardly from the top surface of the body 26, in order to hold the guide rib in place.

The attaching or clamping devices 21 and 22 as mounted on the axle 14 each comprise sections 50 and 51, as illustrated in Figure 7 of the drawings, which are grooved at 52 on their inner faces, to receive the bottom flanges 53 of the I-beam axle 14. The upper inside corners of the sections 50 and 51 are beveled at 55, to fit beneath the upper flanges 56 of the I-beam axle 14, in the relation illustrated in the drawings; the sections 50 and 51 incident to the provision of the grooves 52 having flanges which fit below the I-beam in an abutting relation at the edges 58, as illustrated in Figure 4 of the drawings. It is of course apparent that the sections 50 and 51 are clamped at opposite sides of the I-beam axle 14, and each of the attaching devices 20 and 21 has the sections 50 and 51 thereof clamped together by means of a pair of U-bolts 60, provided with lower screw threaded ends which receive nuts 61, to clamp a detachable strap 62 beneath the sections 50 and 51; it being preferred that the U-shaped bolts 60 straddle the axle and the sections 50 and 51 above the same, in the relation illustrated in the drawings, and that the strap 62 be disposed below the axle in the relation illustrated. On the bottom surfaces of the sections 50 and 51, are provided the solid half cylinder segments 65 and 67 respectively, which abut, when the sections 50 and 51 are assembled, to provide a cylindrical shaped projection extending below the attaching devices 21 and 22, used as a means for centering a spiral compression spring 70 with respect to the snow-shoe 20, as will be subsequently mentioned. The sections 50 and 51, at the outer surfaces thereof are respectively provided with lugs 72 and 73; the lugs 72 of the devices 21 and 22 facing rearwardly, and the lugs 73 facing forwardly. These lugs 72 and 73 are transversely apertured.

The means 23 includes rearwardly extending relatively long straight parallel rods 78 at opposite sides of the longitudinal axis of the snow shoe 20, and parallel with the longitudinal axis thereof, which at their forward ends are screw threaded at 80, as illustrated in Figure 4 of the drawings, for detachable and adjustable reception in a screw threaded opening 81 of a coupling sleeve 82, which has a bifurcated end 83 transversely apertured for pivoted connection by a bolt or other means 84 to an apertured lug 72 as above described. In this manner the rods 78 are connected to the rearwardly extending lugs 72 of the clamping or attaching devices 21 and 22, so that said rods are adjustable to vary the length of said rods with respect to the pivot connections on the pins or bolts 84, as is readily apparent. At their rear ends the rods 78 are flattened at 85, and provided with elongated slots 86 therein, elongated along the axes of said rods, which receive therein transverse pins or bolts 88 which are carried by members 89 clamped or otherwise secured on the top surface of the shoe 20 at the rear end 27 thereof. Each of these members 89 preferably comprises a base 90 having apertures 91 for bolting or riveting or other securement to the body 26 of the snow shoe 20; upstanding spaced flanges or posts 93 being provided on each base 90, apertured at 94 in aligning relation, for receiving the bolts or pivot pins 88 above mentioned which extend thru the elongated slots 86 of the rods 78.

Further referring to the means 23 for connecting the snow shoe to the attaching devices 21 and 22 and consequently to the front axle 14, this means also includes front rods 90 and 91, respectively provided with coupling sleeves 92 and 93, identical in construction with the sleeves 82 above described for the rods 78; the rear ends of the rods 90 and 91 being screw threaded and having an adjustable screw threaded connection in the coupling sleeves 92 and 93. These coupling sleeves 92 and 93 at their rear ends are bifurcated and transversely apertured for receiving pivot pins 94 by means of which to pivotally connect the same to the lugs 73 of the clamp or attaching devices 21 and 22 respectively. The rods 90 and 91 in contradistinction to the rear rods 78 are extended forwardly in a convergent relation, and at their forward ends being flat at 96, and disposed in abutting relation; said flat portions 96 being transversely apertured for receiving a pivot pin 97 therethrough; the pivot pin 97 being carried by the upstanding posts 93 of a member 89 carried at the front of the snow shoe, and of the exact construction as the members 89 above described for the rods 78. It is thus to be noted that the front rods 90 and 91 converge to the longitudinal axis of the shoe 20 and are there pivotally connected on the pin 97. It is preferred that the flat ends 96 of the rods 90 and 91 be provided with elongated openings 98 as illustrated in Figure 3 of the drawings for receiving the pivot pin or bolt 97.

While the means 23 furnishes a plurality of brace and reinforcing rod connections for supporting the snow shoe in proper relation to the axle 14, the same due to the slidable pivot connections of said rods on the pivot pins 88 and 97 of the snow shoe attaching members 89, permit the snow shoe 20 to move towards and away from the axle 14, to a limited degree. This permits of the placement of shock absorbing springs 70 above mentioned, between the axle attaching or connecting devices 21 and 22, and the snow shoe body 20; the devices 21 and 22 having the centering projections above mentioned which receive the upper ends of the springs 70, and the body 26 of the snow shoe 20 having the centering projections 100 which enter the lower ends of the spiral compression springs 70 to center them on the snow shoe 20. The action of the springs 70 is to normally force the snow shoe downwardly away from the axle 14, and the springs 70 are of heavy duty construction, sufficiently of themselves to normally support the vehicle when the snow shoe 20 is resting upon a heavy drift of snow, and relieving the rods 78 and 90 and 91 of the support of the vehicle. The function the springs 70 is to absorb the initial shock of the contact of the snow shoe 20 when the same hits a drift and has a tendency to ride upwardly thereon; thus relieving the vehicle of the shock much in the same manner as the conventional automobile vehicle springs, and the shock is thus not directly transmitted to the connecting rods 78, 90 and 91 to the axle, as is quite obvious.

As is illustrated in Figure 1 of the drawings, in full lines, the front wheels 15 normally ride on the road or ground surface, with the snow shoe 20 suspended above the ground or snow surface, free of vehicle supporting contact therewith. However, when a hard drift of packed snow or ice is encountered, the front wheels have a tendency to enter the same or elevate upon the the same, and become packed therein so as to stall the motor and the vehicle. In this event the snow shoe 20 will come into contact with such hard packed snow, and since the distance between the lower ground engaging tread of the front wheels 15 and the bottom surface of the snow shoe 20 is relatively small, say three inches, the snow shoe 20 will be brought into play prior to the stalling of the vehicle, and the front end of the vehicle will be elevated by the sliding of the snow shoe over the heavy snow or drift; the rear traction wheels of the vehicle being the propelling force necessary to drive the vehicle forward, until the front running gear again rests upon the ground surface. It is of course apparent that the improved shoe construction may be used in connection with other medii than snow, such as on roads where heavy dust, sand, and the like are encountered.

Various changes in the shape, size, and arrangement of parts may be made to the form of invention herein shown and described, without departing from the spirit of the invention or the scope of the claims.

I claim:

1. In combination with a motor vehicle including rear running and traction gearing and front running gear including an axle and supporting wheels therefor, a relatively broad and elongated snow shoe, means resiliently supporting said snow shoe upon the axle and therebelow a short distance upwardly from the normal ground engaging plane at the lower surfaces of the supporting wheels, said last mentioned means comprising forwardly and rearwardly extending axle pivoted brace rods connected with the forward and rear ends of the snow shoe, and spring means under compression between the axle and snow shoe for normally forcing the snow shoe downwardly.

2. In a snow shoe attachment for motor vehicles the combination with a motor vehicle including an axle, a snow shoe, forward brace arms pivotally connected with the axle, rear brace arms pivotally connected with the axle, means pivotally and slidably connecting the foremost and rearmost ends of the forward and rear brace arms with the front and rear ends of the snow shoe with the latter supported below the axle, and spring means under compression between the axle and snow shoe to urge the shoe downwardly.

3. In a snow shoe attachment for motor vehicles the combination of a motor vehicle including rear running and traction gearing and front running gear including an axle and supporting wheels, detachable attaching devices connected with the axle having forwardly extending and rearwardly extending apertured lugs, an elongated broad snow shoe having a straight guide rib extending therebelow, front brace bars pivotally connected with the front lugs of said axle attaching devices, rearwardly extending brace bars pivotally connected to the rearwardly extending apertured lugs of said axle devices, means pivotally and slidably connecting the front and rear ends of the front and rear brace bars to the front and rear ends of said snow shoe respectively with the snow shoe supported below the axle, and spring means under compression between the snow shoe and axle for normally forcing the snow shoe downwardly so that the lower surface thereof is supported a short distance upwardly of the normal ground plane on which the wheels of the front running gear of the vehicle rest.

WILLIAM J. HEINZEL.